United States Patent [19]

Strzelewicz

[11] Patent Number: 4,868,025
[45] Date of Patent: Sep. 19, 1989

[54] CUSHIONED BAG AND APPARATUS AND METHOD OF MAKING A CUSHIONED BAG

[75] Inventor: William B. Strzelewicz, Osterville, Mass.

[73] Assignee: Packaging Industries Group, Inc., Hyannis, Mass.

[21] Appl. No.: 90,767

[22] Filed: Aug. 28, 1987

[51] Int. Cl.⁴ .................. B65D 85/84; B65D 30/08
[52] U.S. Cl. .................................... 428/35.2; 428/158; 428/178; 428/192; 428/284; 428/296; 428/304.4; 428/318.4; 428/319.7; 428/332; 428/334; 428/335; 428/515; 428/516; 383/109; 229/5.6; 220/453; 206/524.2
[58] Field of Search ............... 428/35, 192, 35.2, 158, 428/178, 284, 286, 213, 296, 332, 304.4, 339, 313.3, 335, 318.4, 319.7, 368.9, 349, 500, 516, 515, 34.2, 34.3; 229/5.6, 5.5, 3.5 R; 206/524.2, 523, 245, 484, 632; 220/453, 460, 444, 461; 383/109, 105, 114

[56] References Cited

U.S. PATENT DOCUMENTS

| | | | |
|---|---|---|---|
| 3,256,527 | 6/1966 | Studen | 229/3.5 R |
| 3,948,436 | 4/1976 | Bambara | 206/523 |
| 4,011,798 | 3/1977 | Bambara et al. | 229/48 T |
| 4,038,119 | 7/1977 | Lambert | 428/192 |
| 4,087,002 | 5/1978 | Bambara et al | 206/523 |
| 4,097,236 | 6/1978 | Daly et al. | 428/913 |
| 4,136,205 | 1/1979 | Quattlebaum | 206/497 |
| 4,169,334 | 10/1979 | Ganz et al. | 156/145 |
| 4,270,658 | 6/1981 | Schuster | 428/178 |
| 4,302,270 | 11/1981 | Nicolef | 428/194 |
| 4,422,894 | 12/1983 | Atkinson et al. | 428/192 |
| 4,488,924 | 12/1984 | Kreig | 156/251 |
| 4,531,997 | 7/1985 | Johnston | 428/192 |
| 4,543,279 | 9/1985 | Kai | 428/192 |
| 4,555,025 | 11/1985 | Weinberg et al. | 206/497 |
| 4,628,549 | 12/1986 | Lazar | 428/192 |
| 4,708,283 | 11/1987 | Brazil | 229/5.6 |

Primary Examiner—Ellis P. Robinson
Assistant Examiner—Donald J. Loney
Attorney, Agent, or Firm—Berman, Aisenberg & Platt

[57] ABSTRACT

A cushioned bag has two adjacent multilayered sections comprising an outer layer of flexible thermoplastic material, a middle layer (or partial middle layer) of polyolefin film, and an inner layer of cushioning material. The sections are fused together along at least one edge of the bag to form a seamed edge comprising a fused bead. Apparatus for making a bag having a beaded edge includes cooperating heated jaws between which the bead is formed. A method of using the apparatus to make the bag includes rotating take-up rolls faster than feed rolls to pull the bag cleanly away from the jaws along the bead forming the seamed edge.

11 Claims, 1 Drawing Sheet

U.S. Patent    Sep. 19, 1989    4,868,025
FIG. 1
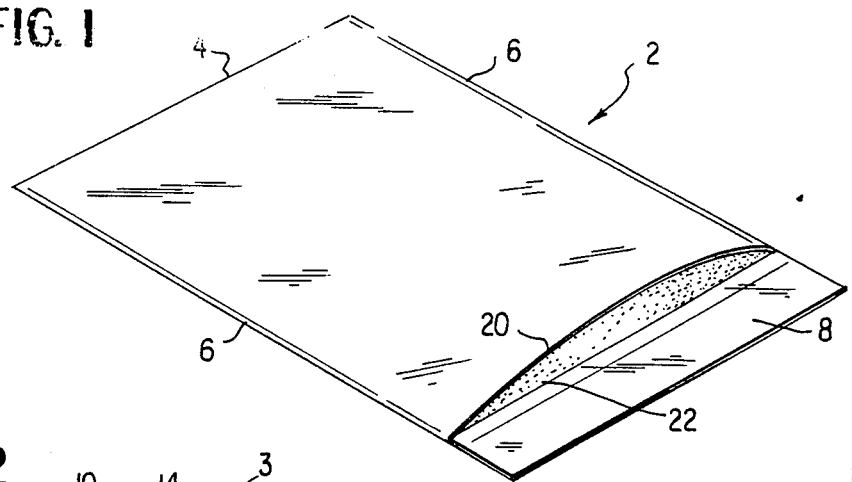
FIG. 2
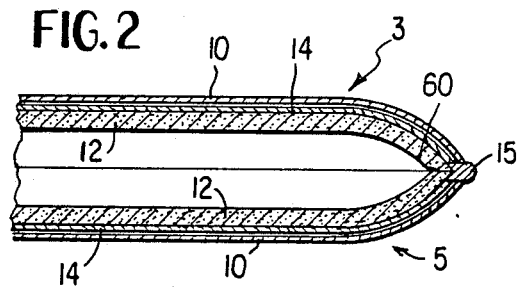
FIG. 3
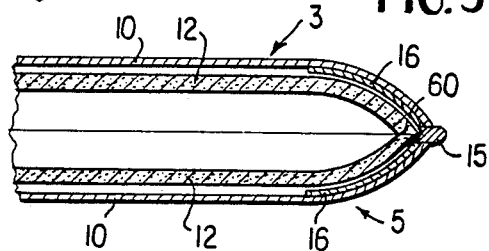
FIG. 5
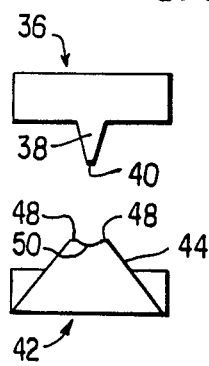
FIG. 6
FIG. 4
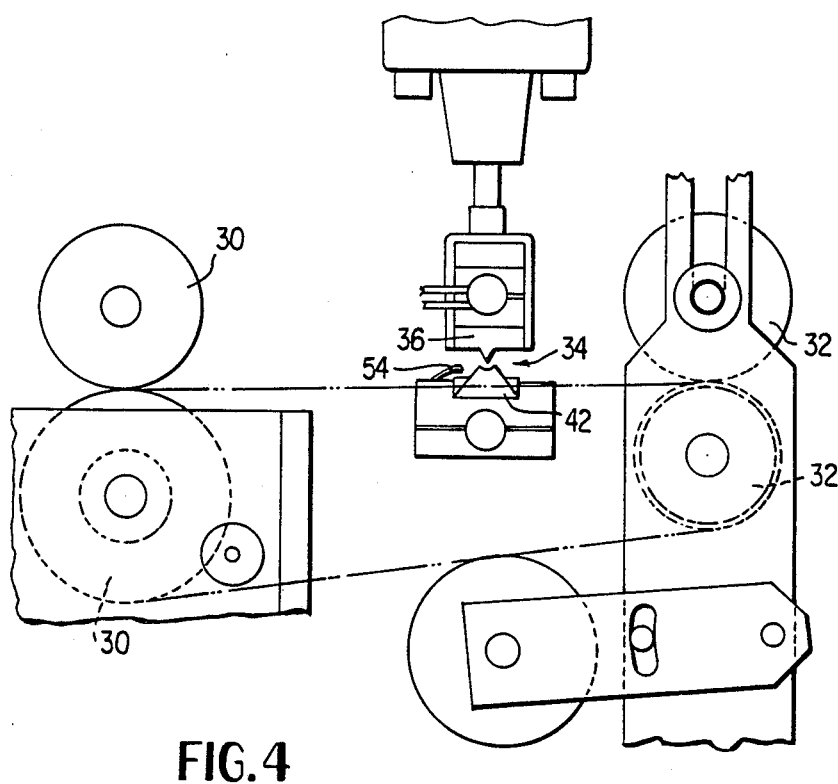

CUSHIONED BAG AND APPARATUS AND METHOD OF MAKING A CUSHIONED BAG

FIELD OF THE INVENTION

The invention relates to cushioned bags and particularly to improved edge seams for cushioned bags.

BACKGROUND OF THE INVENTION

Difficulties have been encountered in making cushioned bags of tear resistant material since tear resistant synthetic non-woven fibrous sheet material, such as Tyvek (manufactured by E. I. Dupont de Nemours and Company), is unable to be heat sealed to itself by known methods. Consequently, bags having Tyvek as an outside layer have heretofore been sealed adhesively.

A known shipping bag using Tyvek is described in Bambara, U.S. Pat. No. 3,948,436. The bag uses Tyvek as one of the middle layers, with a layer of polyethylene film adhesively bonded on either side of the Tyvek. Other patents showing cushioned shipping bags having a kraft outer layer and a foam lining, and methods for making such bags, include Bambara, U.S. Pat. No. 4,011,398 and 4,087,002, and Studen, U.S. Pat. No. 3,256,527. The Studen patent shows heat sealing of a seam by passing the material between heated jaws, but Studen shows the jaws having plane surfaces for contacting the layers. These plane surfaces are curved away from the seamed edge on the side toward the interior of the bag, and the jaws of Studen produce a flat, fin-type seam of two layers of foam laminated together, optionally having an outer layer of paper.

SUMMARY OF THE INVENTION

A cushioned bag of the invention has two adjacent sections of multilayer material, each section comprising an outer layer of flexible, tear resistant, fibrous material, a middle layer of polyolefin film, and an inner layer of cushioning material. The outer layer is preferably Tyvek, a synthetic non-woven fibrous material made by E. I. Dupont de Nemours Company, the middle layer is preferably either high density polyethylene film, linear low density polyethylene film or polypropylene film, and the inner layer is preferably either polyolefin foam or a laminated plastic film material having a plurality of air cavities between the sheets of plastic film. The sections are fused together along at least one edge of the bag by the application of heat and pressure to form a seamed edge comprising an elongated bead of fused material of the three layers.

The middle layer may either be substantially coextensive with the inner layer and the outer layer or may comprise a strip extending from the bead a short distance toward the interior of the bag adjacent the seamed edge. In a further embodiment, the middle layer may be a strip of polyolefin material extruded onto the inner surface of the Tyvek material.

The cushioned bag is made by passing two sections of multilayer material through the nip of feed rolls, and then between a pair of jaws specially designed to produce a zone of fused material forming a seamed edge for the bag, and through take-up rolls which may be pull rolls. The pair of jaws are specially designed for the application of heat and pressure to provide a zone of fused material; a first jaw has a ridge extending therealong and the second jaw has a valley for contacting by the ridge of the first jaw. The pull rolls separate the bags from the jaw, and preferably rotate faster than the feed rolls so that the surface speed of the pull rolls is about twenty percent, or more, greater than that of the feed rolls. Separation of the sealed edge from the lower jaw may be promoted by lifting with a stream of air.

An object of the invention is to provide an improved cushioned bag having an outer layer of tear-resistant flexible material, such as Tyvek.

Another object of the invention is to provide a method for making a bag of the invention.

A further object of the invention is to provide apparatus for making the bag.

BRIEF DESCRIPTION OF THE DRAWINGS

FIG. 1 is a perspective view of a bag of the invention.

FIG. 2 is a schematic cross-section view of an edge seam of the invention.

FIG. 3 is a schematic cross-section view of another embodiment of the edge seam of the invention.

FIG. 4 is an elevation view of apparatus suitable for practicing the invention.

FIG. 5 is an enlarged cross-sectional view of the upper jaw shown in FIG. 4.

FIG. 6 is an enlarged cross-sectional view of the lower jaw shown in FIG. 4.

DETAILED DESCRIPTION OF THE INVENTION

A new cushioned shipping bag has a novel bead forming an edge seam produced by apparatus and a method of the invention. With reference to the Figures, in which like numerals represent like parts, FIG. 1 shows a cushioned mailing bag 2 of the invention. A typical bag 2 has a fold 4 at one end, edge seams 6 along each side, and sealing flap 8 at the end opposite the fold. The bag is composed of two adjacent sections 3 and 5, shown in FIGS. 2 and 3, in which outer layer 10 which may be Tyvek, a synthetic, fibrous, non-woven thermoplastic sheet material made by E.I. Dupont de Nemours and Company, or other thermoplastic flexible sheet material. Inner layer 12 may be any suitable cushioning material, for example, polyolefin foam or polyolefin film laminate having a plurality of air-filled cavities between layers of film.

Middle layer 14 may be a sheet of polyolefin film, for example, high density polyethylene film, linear low density polyethylene film or polypropylene film or other thermoplastic film material suitable for laminating to the inner cushioning layer. The film material is suitably between ½ mil and 1/32 inch in thickness, and is preferably about 1 to 8 mils in thickness. A more preferred thickness is between 2 and 6 mils. A preferred material for middle layer 14 is high density polyethylene which acts as a heat-sink, absorbing heat at the point of fusion of the edge bead, and storing heat to aid in fusion of the layers together.

FIG. 2 shows middle layer 14 substantially coextensive with outer layer 10 and with inner layer 12 to which middle layer 14 is bonded. In FIG. 3 an alternative embodiment is shown in which the middle layer comprises an edge strip 16 running parallel to each edge seam. Edge strip 16 may extend half an inch or more from the bead toward the interior of the bag. The strip is, preferably, one to two inches, or more, in width.

Edge strip 16 is adhesively laminated to outer layer 10 and, if an edge strip 16 is used in place of middle layer 14, inner layer 12 does not have a film layer laminated thereto. Alternatively, edge strip 16 may comprise a strip of film, preferably high density polyethylene film, extruded in molten state onto the inner surface of outer layer 10. The strip of film may be applied using an extrusion head capable of extruding a strip of molten material (such as high density polyethylene film) onto a web (such as Tyvek or other thermoplastic, flexible sheet material), and may, for example, be air-powered.

In making the bag, multilayer material is assembled in sections by applying strips of adhesive adjacent the edges to secure the layers together at the edges which will become bag-opening edges 20 and 22. The adhesive secures the outer layer to the inner layer, or to the middle layer (if the middle layer is coextensive with the inner and outer layers). A strip of adhesive may also be applied in the general area of fold 4 of finished bag 2. In an alternative embodiment, all three layers may be laminated together, and adhesive strips will not be needed at the bag-opening edges. The multilayer material is folded over, by known means, positioning inner layers 12 of sections 3 and 5 adjacent to each other. The folded area becomes fold 4 of bag 2. The folded sections, having edges 20 and 22 positioned according to their relative positions in the finished bag, are passed through the nip of feed rolls 30, shown in FIG. 4, and taken up by pull rolls 32 after passing between jaws 34.

FIG. 4 shows the novel portion of apparatus used to make bags of the invention. The remainder of the apparatus is known in the art. The multilayer material passes through the apparatus in a continuous but incremental manner, each increment of movement corresponding to the passage of a bag through the jaws. Alternative means for feeding the material to, and pulling the material from, the jaws may be used.

Jaws 34 are shown in detail in FIGS. 5 and 6. Upper jaw 36 has ridge portion 38 extending along its length, at least the length of the edge seam being formed. Ridge portion 38 has a small flat portion 40 on the underside thereof. The sides of ridge portion 38 each preferably extend at an angle of about 15° to the vertical. Flat end portion 40 is about 0.03 inch wide. FIG. 6 shows lower jaw 42 in detail. Sides 44 of lower jaw 42 extend at an angle of about 45° to the horizontal and the top surface of a lower jaw 42 has two horizontal edge portions 48, which may each be about 0.03 inch wide, and a valley 50 therebetween which is preferably shaped as an arc of a circle of approximately 0.094 inch in radius. Valley 50 is, for example, 0.15 inches across its top surface. Other suitable dimensions will be apparent to one skilled in the art. End portion 40 of top jaw 36 touches, or almost touches, the deepest point of valley 50 when the jaws are closed.

The jaws are preferably made of aluminum. While upper jaw 36 is illustrated as having a ridge extending therefrom and lower jaw 42 is illustrated as having a valley cooperating with the ridge, the jaws may be reversed so that the ridge extends from the lower jaw and cooperates with a valley in the upper jaw.

When the two sections of material pass through the jaws, upper jaw 36 descends to lower jaw 42 and the jaws close. The timing interval is interrupted for approximately ½ second and heat is applied through the jaws to the material therebetween. The jaws are heated to a temperature of between about 250° and 400° F., and the heated jaws cause the material of the layers of the two sections therebetween to fuse and form bead 15. Edge bead 15 is formed between end portion 40 of upper jaw 36 and valley 50 of lower jaw 42, along the length of edge 6. The edge seam of one bag forms on one side of ridge 38 at the same time as the edge seam of the adjacent bag forms on the other side of ridge 38. As the jaws begin to open, or immediately prior to that time, take-up rolls 32 restart and exert tension on the bag that has passed through the jaws. Take up rolls 32 rotate, for example, with a surface speed between about 20 and 25 percent faster than the surface speed of feed rolls 30, thus pulling the completed bag away from the jaws. Jaws 36 and 42 may be coated with teflon or other release coating. Further assistance for releasing the bag on the feed roll side of the jaws may be provided by a stream of air emitted from jet 54, shown on FIG. 4. The jaws are repeatedly opened and closed, each cycle producing a beaded seam on adjacent edges of successive bags passing through the machine.

In a non-limiting example of the invention, the jaws are approximately 5 inches from feed rolls 30, and 3 to 4 inches from take-up rolls 32, thus preventing any problem with feeding the bags through the rolls following interruption in the cycle. Jaws 36 and 42 preferably close at a level slightly elevated from the direct path between the circumferences of the feed rolls and take-up rolls.

An important feature of the apparatus is found in the shape of the jaws, and in particular, in ridge 38 cooperating with valley 50, since the valley retains heat necessary for bead formation. The presence of a valley ensures that there is sufficient material and sufficient heat in the bead area to form a strong edge seam, and a typical seam has a strength of approximately 12 to 20 lbs. per linear inch of seam, a higher strength being achieved using high density polyethylene film of 2 (or more) mils in thickness. High density polyethylene film has a heat-sink property, i.e., it holds heat longer than low density polyethylene film due to its higher molecular weight, and thus enhances fusion, while preventing disintegration of the Tyvek due to heat.

Inner layer 12 may be polyolefin foam, or other thermoplastic foam, or other material suitable for cushioning bags. Inner layer 12 may, for example, be a laminate of two layers of polyolefin film having a plurality of air-filled cavities formed therebetween. Other suitable materials for the inner layer will be apparent to one skilled in the art. In a preferred embodiment, middle layer 14 and inner layer 12 may be laminated together prior to sealing to outer layer 10. A suitable combination of inner and middle layers is that of co-pending Serial No. 838,789, filed March 12, 1986, and assigned to the assignee of this application. Laminates of that invention retain the thickness of the individual layers throughout the majority of the surface area of the laminate, without losing any thickness in the laminating process, and thus provide maximum cushioning.

The area immediately adjacent the seam edge 6, on the inside of the bag, shown as 60 in FIGS. 2 and 3, is an area in which the inner layers are bonded together without substantial loss of cushioning thickness, and a continuum 60 of inner layer cushioning material 12 is formed across the edge seam area. This continuum 60 of cushioning material 12 provides superior strength properties and protects objects within the bag from damage.

A seam edge having a fused bead 15 extending along the seam has not heretofore been able to be produced, and there is no waste in its production since there is no waste at the nip of jaws 36 and 42. A clean beaded seam edge is formed on the bags on both sides of ridge 38, and the completed bag is cleanly pulled away by the tension provided by take-up rolls 32 upon which part of the completed bag is already taken up before the jaws close to form the bead. The take-up rolls pull the seam edge away from the nip of the jaws. Other spacings will be apparent to one skilled in the art according to the size of bag produced and the material used.

Another bag of the invention may have a fold on each side with the layers joined down the length of the bag and a beaded seam edge at the end of the bag opening. Alternatively, a bag may have three beaded seam edges according to the invention. Apparatus for making these variations is known in the art, and the beaded edges are made as described above.

In another bag of the invention, there may be further layers of themoplastic material. The edge bead(s) will be formed, as described above.

While the invention has been described above with respect to certain embodiments thereof, it will be appreciated that variations and modifications may be made without departing from the spirit and scope of the invention.

What is claimed is:

1. A cushioned bag having two adjacent multilayered sections, each section comprising:
   (a) an outer layer of flexible, tear-resistant, spun-bonded linear polyetheylene fiber thermoplastic sheet material,
   (b) a middle layer of polyolefin film, and
   (c) an inner layer of flexible, thermoplastic sheet cushioning material,
wherein said sections are joined together along at least one edge of the bag in a joined edge comprising a fused edge bead of fused material of each of said layers.

2. A cushioned bag of claim 1 wherein the middle layer is substantially coextensive with the inner layer and the outer layer.

3. A cushioned bag of claim 1 wherein the middle layer comprises a strip of film material extending from the bead toward the interior of the bag along the joined edge.

4. A cushioned bag of claim 3 wherein the middle layer comprises a strip of high density polyolefin film extruded onto the outer layer adjacent the edge to be joined.

5. A cushioned bag of claim 1 wherein the inner layer of one section is bonded to the inner layer of the other section adjacent the bead.

6. A cushioned bag of claim 5 wherein a continuum of the inner layer material traverses the interior of the bag adjacent the bead providing cushioning across the joined edge.

7. A cushioned bag of claim 1 wherein the middle layer is a member selected from the group consisting of high density polyethylene film, linear low density polyethylene film and polypropylene film.

8. A cushioned bag of claim 7 wherein the inner layer comprises foamed plastic sheet material or a laminate of two layers of plastic film having a plurality of air-filled cavities formed therebetween.

9. A cushioned bag of claim 1 wherein the middle layer, is between 1 mil and 8 mils in thickness.

10. A cushioned bag of claim 9 wherein the middle layer, is between 2 mils and 6 mils in thickness.

11. A cushioned bag of claim 7 wherein the middle layer comprises high density polyethylene film of between 2 mils and 6 mils in thickness.

* * * * *